(12) United States Patent  (10) Patent No.: US 6,729,774 B1
Rast et al.  (45) Date of Patent: May 4, 2004

(54) ELECTRO-OPTICAL MODULE

(75) Inventors: Alfred Rast, Regenstauf (DE);
Gerhard Kuhn, Koefering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/511,815

(22) Filed: Feb. 24, 2000

(30) Foreign Application Priority Data

Feb. 24, 1999  (DE) .......................................... 199 10 164

(51) Int. Cl.[7] .................................................. G02B 6/42
(52) U.S. Cl. ........................................... 385/88; 385/56
(58) Field of Search ....................................... 385/8–94

(56) References Cited

U.S. PATENT DOCUMENTS

| | | | |
|---|---|---|---|
| 4,461,537 A | | 7/1984 | Raymer, II et al. |
| 5,369,529 A | * | 11/1994 | Kuo et al. ................... 359/858 |
| 5,390,271 A | | 2/1995 | Priest |
| 5,515,468 A | * | 5/1996 | DeAndrea et al. ............. 385/88 |
| 5,774,616 A | | 6/1998 | Matsuda |
| 6,086,263 A | * | 7/2000 | Selli et al. ...................... 385/88 |
| 6,287,016 B1 | * | 9/2001 | Weigel ........................... 385/58 |
| 6,450,701 B1 | * | 9/2002 | Cryan et al. .................... 385/89 |
| 6,454,470 B1 | * | 9/2002 | Dwarkin et al. ............... 385/93 |
| 6,457,875 B1 | * | 10/2002 | Kropp et al. ................... 385/89 |

FOREIGN PATENT DOCUMENTS

| | | |
|---|---|---|
| DE | 32 43 309 A1 | 7/1983 |
| DE | 196 22 459 C1 | 11/1997 |
| EP | 0 573 941 A1 | 12/1993 |

* cited by examiner

*Primary Examiner*—John D. Lee
*Assistant Examiner*—Sarah Song
(74) *Attorney, Agent, or Firm*—Laurence A. Greenberg; Werner H. Stemer; Gregory L. Mayback

(57) ABSTRACT

An electro-optical module includes a connector and a module body having an electro-optical converter. The connector accommodates one end of a fiber optic waveguide segment and aligns it with the optical connector interface at the side of the module body. The connector interface is provided at the top side of the module body.

9 Claims, 1 Drawing Sheet

ELECTRO-OPTICAL MODULE

BACKGROUND OF THE INVENTION

Field of the Invention

The invention is in the field of optical data transmission and relates to the connection of a fiber optic waveguide segment to an electro-optical module. Such fiber optic waveguide segments are also called pigtails and are intended for transmitting optical signals to or from the module in order to couple the module optically with another component. The other component can be another module, for example, or also a connector plug of a fiber optic connection cable or a trunk cable.

The invention relates in particular to an electro-optical module with a module body containing an electro-optical converter and a connector that accommodates one end of a fiber optic segment and can be connected for an optical connection of this end with an optical connector interface on the module body side.

The term "electro-optical converter" is to be interpreted, within the scope of the invention, as a component that emits optical signals (light signals in the range of 400 nm to 1500 nm, for example) in response to an electric control. Such a component is also called optical transmitter in the following. The term "electro-optical converter" also means a component that converts optical signals into the corresponding electrical signals. Such a component is also referred to as optical receiver.

A module of the above-mentioned type is described in the Published European Patent Application EP 0 573 941 A1. In accordance with the conventional architecture, such a module includes a module body with a module housing. The module body may also be formed of an injection molding body in accordance with a more modern configuration. The module body of the module includes in its interior at least one electro-optical converter and has a multitude of connectors projecting from its narrow longitudinal sides or its bottom side. The module sides are named for the purpose of this invention on the basis of the respective function-location or installation position of the carrier printed circuit board. At one narrow front side of the module, a connector is provided which accommodates one end of the fiber optic segment ("pigtail"), which is ready for a coupling. The connector is held at the narrow front side in the manner that the end of the fiber optic segment is aligned for an optical coupling with the corresponding connector interface on the module body side. The connector interface can be, for example, provided in a receptacle sleeve and be located in a direct, straight optical connection path between the converter and the end of the fiber optic waveguide segment. The interface can also include a so-called region of free beam propagation between the end of the fiber optic waveguide and the converter.

The injection molding process for manufacturing the module body can damage the fiber optic waveguide due to the generated heat. Also, during a module installation, the required soldering of the connector contacts to the electrical signal input lines or the signal output lines on a carrier printed circuit board can damage the fiber optic waveguide due to the generated heat. For this reason, Published European Patent Application EP 0 573 941 A1 teaches that the connector having the fiber optic waveguide segment is to be connected with the connector interface of the module body only after the injection molding process is completed.

For mounting the module on the carrier printed circuit board, space is needed for the fiber optic waveguide segment, which extends in a horizontal direction. If the connection of the fiber optic segment with the module body is accomplished only after mounting the module body on a carrier printed circuit board, for example, additional space is needed in the area of the module body for handling and accomplishing the connection.

SUMMARY OF THE INVENTION

It is accordingly an object of the invention to provide an electro-optical module which overcomes the above-mentioned disadvantages of the heretofore-known electro-optical modules of this general type and which has a fiber optic waveguide segment ("pigtail") that can be connected subsequently. In particular, it is an object of the invention to provide an electro-optical module which allows to place or install additional electronic and other components in its immediate vicinity on a carrier printed circuit board.

With the foregoing and other objects in view there is provided, in accordance with the invention, an electro-optical module configuration, including an electro-optical module having:

a module body having a top side;

an optical connector interface disposed at the top side of the module body;

an electro-optical converter disposed in the module body;

a fiber optic waveguide segment having an end region; and a connector accommodating the end region of the fiber optic waveguide segment, the connector being connectable to the optical connector interface for optically connecting the end region.

In other words, the object of the invention is achieved in that the connector interface is formed at the top side of the module body. An essential aspect of the module of the invention is, therefore, that the fiber optic waveguide segment can be adjusted and attached in the area of the top side (in an installation position thus on the rear side) of the module body. The fiber optic waveguide segment is to be connected only after the completion of the module body and, if necessary, can later be removed again. The fiber optic waveguide segment and the connector are located at an adequate height, for example at a sufficient height above the surface of the carrier printed circuit board, after the connection has been made, so that additional optical components can be installed or placed in the immediate vicinity of the module. This is especially advantageous when modules operated at a high frequency are used and when optical receivers are connected, because the pre-amplifier provided for an operation of the receiver should be provided in the immediate spatial vicinity of the receiver for reasons of an improved processing of signals.

In accordance with an another feature of the invention, the connector is connected with catch elements or detent elements to the module body. This is advantageous with regard to installation and especially for a possible removal of the connector from the module body.

In accordance with a further feature of the invention, the connector and the fiber optic waveguide segment projecting from the connector extend at a height of more than 3 mm above the bottom side of the module. Such a height allows sufficient space in practical applications of the module.

In accordance with a further advantageous feature of the invention, the module is configured as a surface mountable module.

In order to lead the fiber optic waveguide parallel to the surface of a carrier printed circuit board and parallel to the top side of the module, respectively, a preferred embodiment of the invented module provides that the connector interface includes a beam deflector that deflects the beam between the converter and the end of the fiber optic segment, which is oriented horizontally in its mounted position.

Other features which are considered as characteristic for the invention are set forth in the appended claims.

Although the invention is illustrated and described herein as embodied in an electro-optical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
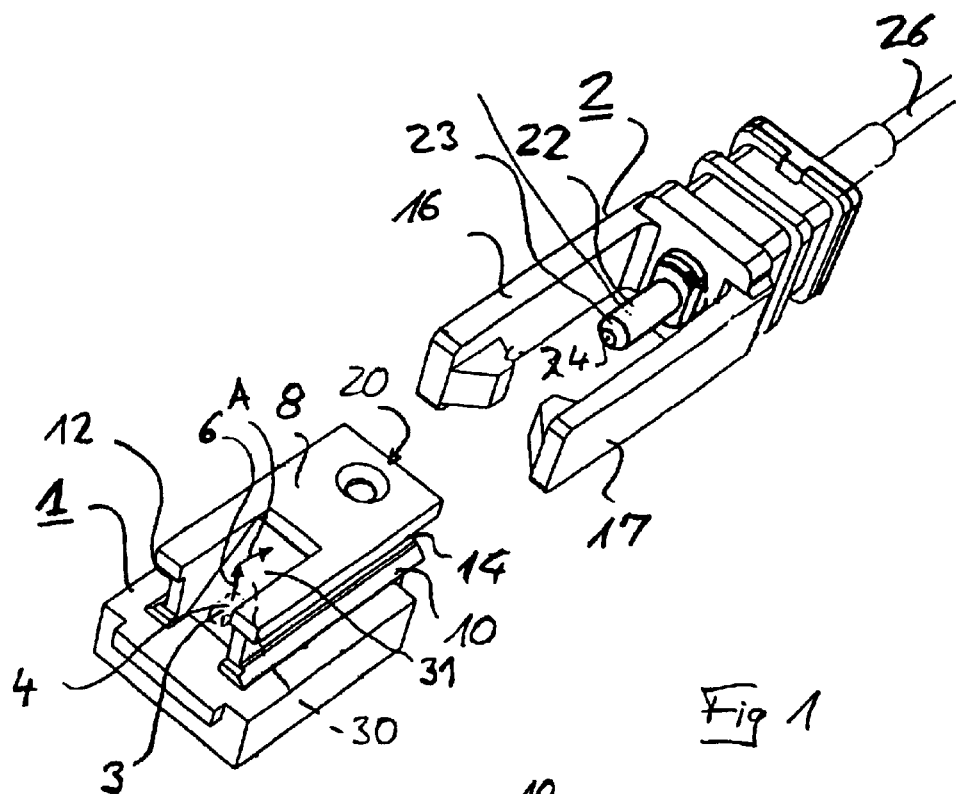
FIG. 1 is an enlarged perspective view of the module according to the invention.

Referring now to the figures of the drawings in detail and first, particularly, to FIG. 1 thereof, there is shown a module including a module body 1 and a connector 2. The connector and the module body are shown in FIG. 1 in a state prior to the assembly, when they are still in a separated state. The module body 1 contains an electro-optical converter 3, which is schematically indicated with dotted lines. The converter may be a transmitter in this exemplary embodiment, but can of course also be a receiver. In response to an electric control, the converter 3 generates light signals 6 in the area of an optically active zone 4. The light signals are transmitted vertically upward to the top side 8 of the module.

The module top side 8 has a connector interface 20 in a mechanical coupling block 10 with receptacle grooves 12, 14 running along lateral sides. The receptacle grooves 12, 14 are intended for guiding and fixing the catch arms 16, 17 of the connector 2. A plug pin 22 of the connector can be inserted in the coupling block 10.

One end 24 of a fiber optic waveguide segment 26 is terminated with the front side 23 of the plug pin 22. When inserted, the end 24 is aligned with the optical connector interface 20. The connector interface 20 includes in its interior a deflector mirror surface 30 that is disposed at an inclination or slant 31 in the inner side and at which the emitted beam 6 is deflected by 90° in the direction of the arrow A. The geometrical configuration and the deflection are dimensioned such that an optical path between the end 24 and the converter 3 is formed with a high optical coupling quality or coupling efficiency.

The connector interface 20 is easily accessible from the outside due to the way it is installed and integrates the guide function for the plug pin 22.

Figure 2:
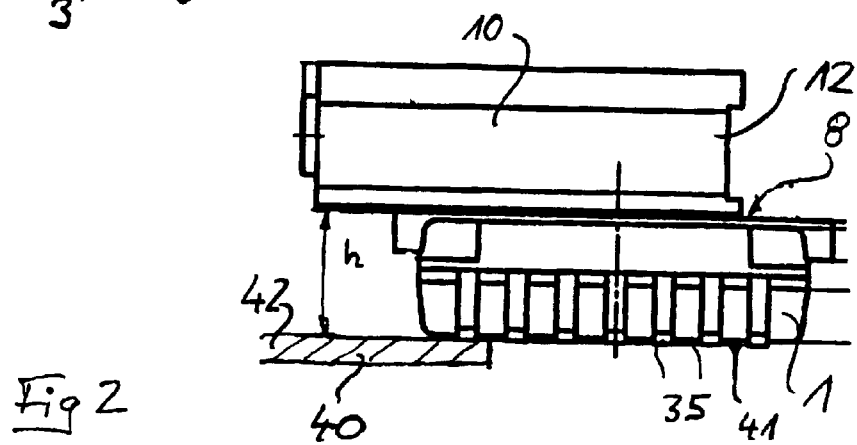
FIG. 2 is a side elevational view of the module body shown in FIG. 1.
Figure 3:
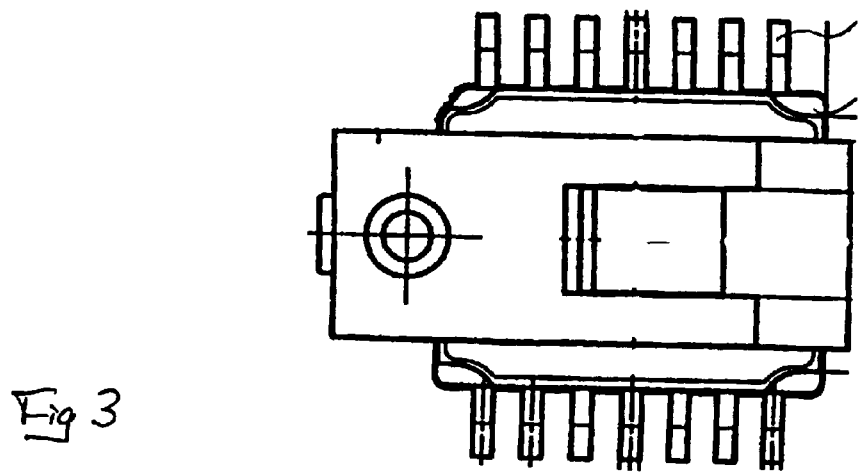
FIG. 3 is a top view of the module body shown in FIG. 1.

As shown in FIGS. 2 and 3, the grooves (FIG. 2 shows only groove 12) of the mounting block 10 are provided in a manner that a sufficient mounting and connecting clearance h of at least 3 mm for the connector 2 (FIG. 1) is provided for the installation of additional components in the immediate vicinity of the module body. In this manner, additional electronic components—for signal processing, for example—can be placed or mounted in the immediate vicinity of the converter contained in the module body 1. As FIGS. 2 and 3 additionally illustrate, the connector contacts 35 projecting from the narrow side surfaces of the module body 1 are configured or suited for surface mounting. When the module body 1 is mounted on a carrier printed circuit board 40, which is only partially shown, the underside or the bottom side 41 of the module faces the surface 42 of the carrier printed circuit board 40 directly. The top side or rear side 8 of the module is consequently facing away from carrier printed circuit board 40.

We claim:

1. An electro-optical module configuration, comprising:
   an electro-optical module including:
      a module body disposed on a printed circuit board, said module body having a planar top side;
      a mechanical coupling block exclusively supported on said planar top side of said module body;
      an optical connector interface disposed in said mechanical coupling block;
      an electro-optical converter disposed in said module body;
      a fiber optic waveguide segment having an end region; and
   a connector accommodating said end region of said fiber optic waveguide segment, said connector being connectable to said optical connector interface for optically connecting said end region.

2. The electro-optical module configuration according to claim 1, wherein said connector includes catch elements for connecting said connector to said module body.

3. The electro-optical module configuration according to claim 1, wherein:
   said electro-optical module has a bottom side;
   said fiber optic wave guide segment has a region projecting from said connector; and
   said connector and said region of said fiber optic waveguide segment projecting from said connector extend at a height of more than 3 mm above said bottom side of said electro-optical module.

4. The electro-optical module configuration according to claim 1, wherein said electro-optical module is configured as a surface-mountable module.

5. The electro-optical module configuration according to claim 1, wherein said end region of said fiber optic waveguide segment is oriented essentially horizontally in a mounted state, and said optical connector interface includes a beam deflector for deflecting a beam path between said electro-optical converter and said end region of said fiber optic waveguide segment.

6. The electro-optical module configuration according to claim 1, wherein said connector interface is formed as one piece.

7. The electro-optical module configuration according to claim 2, wherein said connector interface includes laterally extending grooves formed therein for guiding and fixing said catch elements.

8. In combination with a printed circuit board having a surface, an electro-optical module, comprising:
   a module body disposed on a printed circuit board, said module body having a planar top side;

a mechanical coupling block exclusively supported on said planar top side of said module body;

an optical connector interface disposed in said mechanical coupling block;

an electro-optical converter disposed in said module body;

a fiber optic waveguide segment having an end region;

a connector accommodating said end region of said fiber optic waveguide segment, said connector being connectable to said optical connector interface for optically connecting said end region;

said end region of said fiber optic waveguide segment, in a mounted sate, being oriented essentially parallel to the surface of the printed circuit board; and said optical connector interface including a beam deflector for deflecting a beam path between said electro-optical converter and said end region of said fiber optic waveguide segment.

9. In combination with a printed circuit board having a surface, an electro-optical module, comprising:

a module body disposed on the printed circuit board, said module body having a planar top side;

a mechanical coupling block exclusively supported on said planar top side of said module body;

an optical connector interface disposed in said mechanical coupling block;

an electro-optical converter disposed in said module body;

a fiber optic waveguide segment having an end region; and a connector to be connected to said optical connector interface for optically connecting said end region of said fiber optic waveguide segment, said connector accommodating said end region.

* * * * *